Nov. 3, 1931.  C. R. KEW  1,830,113
CALIPER
Filed Aug. 26, 1930
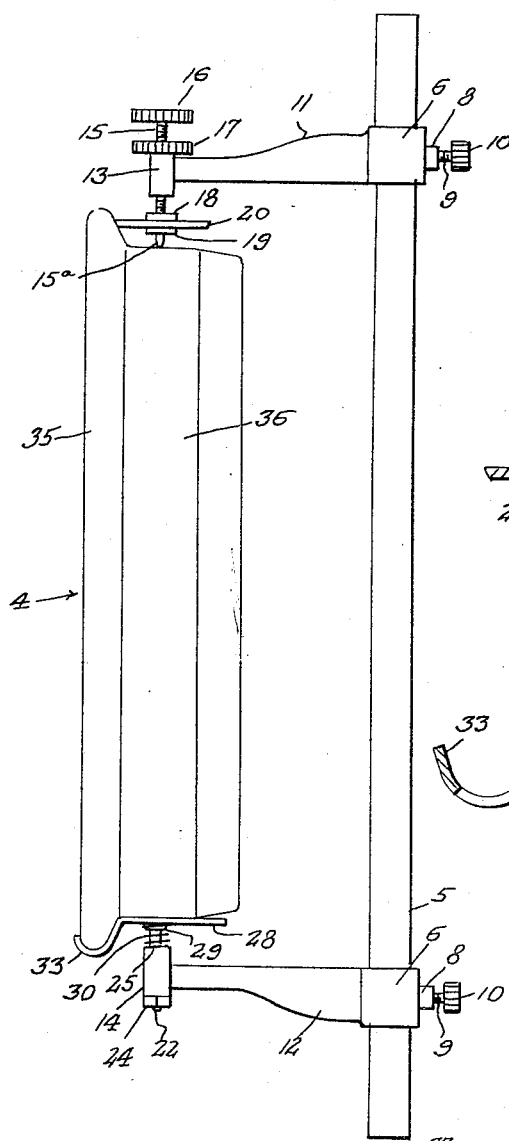
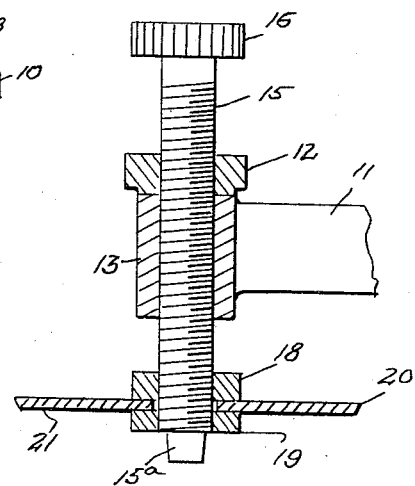
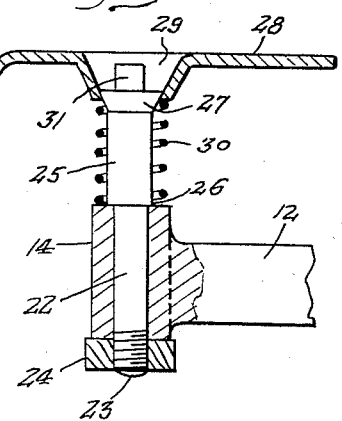
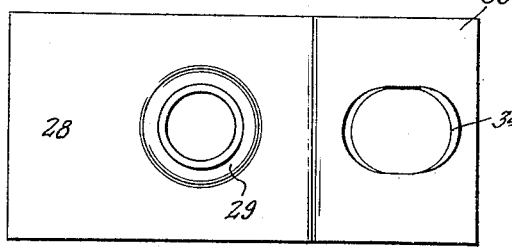
Inventor
Charles R. Kew Patented Nov. 3, 1931

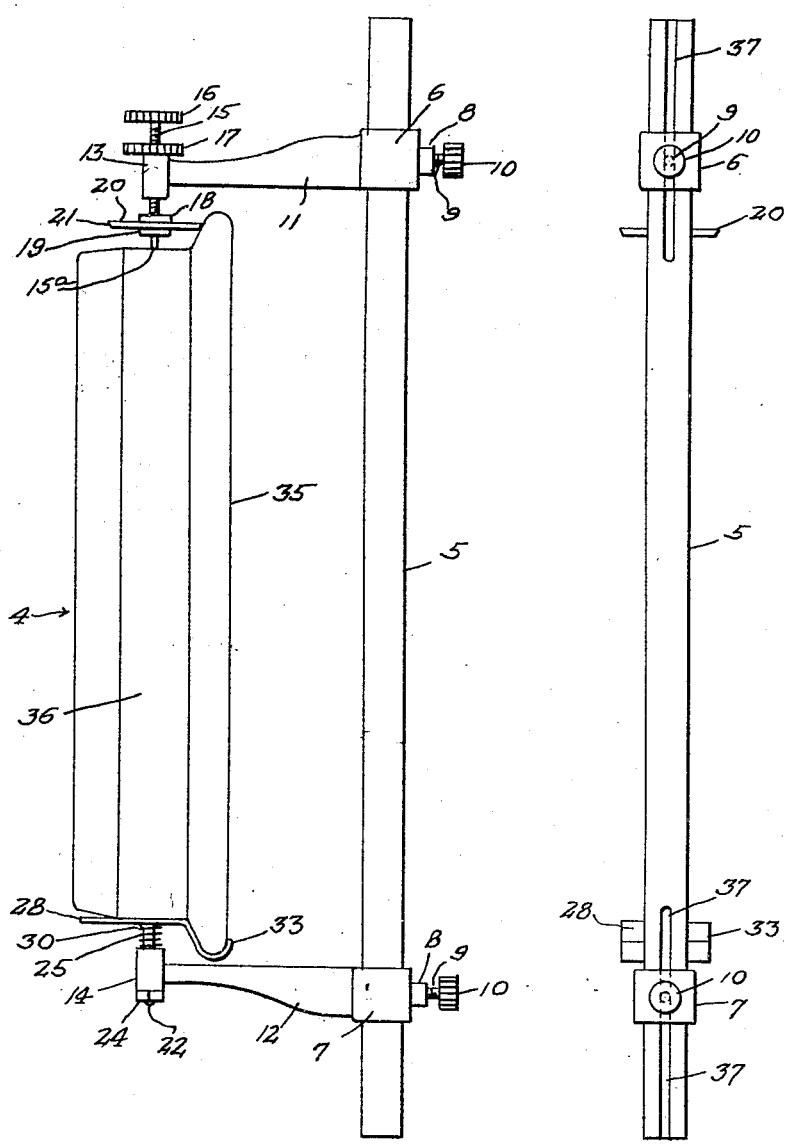

1,830,113

UNITED STATES PATENT OFFICE

CHARLES R. KEW, OF KANSAS CITY, MISSOURI

CALIPER

Application filed August 26, 1930. Serial No. 477,916.

This invention relates generally to calipers and particularly to a caliper for use in gauging the turning of railroad car wheels, driving wheeltires, and steel engine truck, tender truck, coach and freight car wheels, the gauging of driving wheel tires being the most important use of the invention, and which enables the performance of superior work of this type.

It is well known that after a period of service the steel tires of driving wheels and steel railroad car wheels become worn and the flanges and rim portion required to be trued to restore the complete serviceability of the tires, and this operation is usually performed in a turning lathe, and the operation is usually gauged by a caliper, the proper operation of which requires the services of the lathe attendant and at least one other person.

It is an object of this invention to provide a caliper of the type described, which possesses new and novel features which result in a new and improved efficiency in devices of this kind.

It is also an object of this invention to provide a caliper of the type described, which is capable of being and is intended to be properly used and employed in the operations stated by one person, who may be the lathe hand.

It is also an object of this invention to provide a caliper of the type described, which is composed of few and simple parts, which is easy and satisfactory in operation, and which is admirably suited for the purposes for which it was designed, being capable of an extraordinary degree of accuracy and adjustability and in addition is inexpensive and easy to manufacture.

These and further objects of this invention, its nature, its composition and arrangement and combination of parts will be readily understood by anyone acquainted with the art to which this invention relates upon reading the descriptions of the drawings, in which:

Figure 1 is a side elevation of my improved caliper shown in position on a car wheel tire.

Figure 2 is a similar view to Figure 1 with the exception that the car wheel is shown facing an opposite way and the flange plate is turned in the opposite direction to accommodate the flange.

Figure 3 is a side view directly from the right of Figure 1.

Figure 4 is a detail vertical cross section through the parts cooperating with the gage screw, the screw itself being shown in elevation.

Figure 5 is a detail vertical cross section through the flange plate structure.

Figure 6 is a bottom view of the flange engaging plate.

It is to be understood that I do not desire to limit the application of this invention to the particular modifications set forth herein to illustrate the same, and any change or changes may be made in material and structure consistent with the spirit and scope of the invention.

Referring in detail to the drawings, the numeral 5 indicates a tram bar having slidably mounted thereon collars or sleeves 6 and 7 at one side of each of which is a boss 8 which has a screw-threaded bore to accommodate a clamping screw 9 adapted to be moved in said boss to contact the bar and the clamp screws 9 are provided with knurled knobs 10 for conveniently and quickly operating them.

On the side of the collars 6 and 7 opposite to the clamp screws are horizontally projecting tram arms 11 and 12 which are provided at their outer ends with cylindrical enlargements 13 and 14 which have perpendicular screw-threaded bores therein.

The tram arm 11 carries in said perpendicular bore the screw 15 which projects downwardly and terminates in a reduced frustoconical point, 15a. The upper end of the gage screw 15 is provided with a knurled knob 16 for conveniently operating the same, and below said knurled knob 16 is provided a round, and knurled nut 17 screw-threaded on said screw 15 and adapted to abut the upper end of the cylindrical enlargement 13 to function as a lock nut for the gage screw 15.

On the part of the gage screw projecting below the cylindrical enlargement 13 is an upper nut 18 neatly screwed on the thread of the vernier screw and another nut 19 spaced below the nut 18 and similarly fitted on the gage screw, and between said nuts and adapted to rotate on the screw is a circular disc 20 having its edge 21 beveled upwardly away from the axis for a purpose to be hereinafter described.

The lower tram arm 12 carries in the bore of the cylindrical enlargement 14 a pin having a reduced portion 22 screw-threaded on its lower end 23 and provided with the nut 24 thereon, for engaging against the lower face of the enlargement 14 for securing the pin 22 therein. Above the portion 22 is an enlargement affording a shoulder 26 which is adapted to abut the upper end of the cylindrical enlargement 14.

The upper end of the enlarged portion 25 is provided with an outwardly flaring portion 27 which forms a bearing surface to receive a car wheel flange-engaging plate 28 which is provided with a conical well 29 intermediate its ends, the said flared portion 27 being larger than the aperture in the lower part of said conical well 29.

A coiled spring 30 normally expands against the upper end of the enlargement 14 and the lower end of the conical well 29 on the plate, to maintain the desired tension between said elements and to help for a swivel joint between the enlargement and the plate. Just above the flared portion 27 is a boss 31.

The flange plate 28 is rectangular and has one end part bent downwardly and then upwardly to form a hook 33 in which is an oval aperture 34. It is obvious that the hook 33 is so formed that it is adapted to fit the flange 35 of a car wheel tire, and the plane portion of the plate is adapted to conform with the contour of the rim portion 36 of a railroad car wheel tire, as illustrated in Figures 1 and 2 in which the said car wheel is generally designated by the numeral 4.

Guide slots 37 are provided in each end portion of the tram rod 5, in which slots the ends of the clamp screws 9 engage, to preserve the parallelism of the trams 11 and 12. The swivel joint supporting the flange plate 28 permits the use of the caliper at any desired angle, and also permits the complete reversal of the flange plate 28, while providing for proper centering of the caliper.

The boss 31 is adapted to engage a point on the work, and the frusto-conical tip 15a on the gage screw 15 on the upper tram arm is adapted to be brought in contact with a corresponding point on the opposite side of the work. The upwardly bevelled edge 21 on the disc 20 provides for gauging the proper contour of a portion of the flange, at one side of the tire, and the hook 33 completely conforms to the contour of the flange.

The boss 31 and the frusto-conical tip 15a constitute the gauge points, and they are maintained as described, on the proper measuring line on the apparatus without the assistance of a second person to assist therein, which is commonly necessary at the present time.

It will of course, be understood that the flange plate 28 maintains the lower gauge point at the desired distance from the flange. The hook of the flange plate is forced into engagement with the flange and the flat portion of the plate is pressed into contact with the rim of the tire, and the plate may be slid around the periphery of the tire as desired.

It will now be evident that I have provided a caliper for the purpose described, which is of improved and novel construction, embodying features and elements of novelty brought together in a new arrangement, which results in an extraordinarily easily operated and very accurate caliper of the type described, which is composed of few and simple parts, and which is easy and simple to manufacture.

I claim:

A caliper for gaging locomotive drive wheel tires and steel wheels of railroad cars, said caliper comprising a tram bar having in the end portions thereof aligned slots, a pair of collars slidable on said bar and each provided on one side thereof with a transverse threaded opening, clamping screws respectively cooperating with said threaded openings and each registering with a corresponding slot in the tram bar, tram arms respectively projecting from the sides of the collars opposite the clamping screws, said bars being provided at their outer ends with aligned openings, one of which only is threaded, a gage screw cooperating with the threaded opening and having its gaging point directed towards the other arms, a centrally perforated disc rotatively mounted on the screw between its point and the arm, means for positioning the disc longitudinally of the screw, a lock nut on the screw for cooperation with the arm, a pin for the other arm, said pin having one end portion thereof reduced in size, thereby providing a shoulder at one end of the reduced portion, said portion being threaded at the other end and being inserted in the opening in the arm with the enlarged portion projecting towards the gage screw of the other arm, there being a nut on the threaded end of the reduced portion to retain the pin in place in the arm, the free end of the enlarged portion of the pin merging into an outwardly flared part, a contour plate for engaging and conforming to the contour of the flange and rim portion of the tire to be gaged, said plate having in one side thereof a conical depression with an aperture in its bottom, said outwardly flared part of the pin being received in said conical depression to form therewith a swivel joint, and an expansible coil spring between the end portion of the tram arm and the side of the plate opposite its conical depression.

In testimony whereof I affix my signature.

CHARLES R. KEW.